May 12, 1936.  H. ZIMMERMANN  2,040,722

LOCK AND GATE STRUCTURE

Filed Aug. 5, 1932

Inventor:
H. Zimmermann
By: Marks & Clerk
Attys.

Patented May 12, 1936

2,040,722

UNITED STATES PATENT OFFICE 2,040,722

LOCK AND GATE STRUCTURE

Hans Zimmermann, Dortmund, Germany, assignor to the firm Vereinigte Stahlwerke Aktiengesellschaft, Dusseldorf, Germany Application August 5, 1932, Serial No. 627,671
In Germany July 2, 1931

7 Claims. (Cl. 61—22)

The present invention relates to lock and gate structures and more especially to strip packings for such structures which serve to make the wall of the gate tight against the body of the lock, and provides an improvement upon such packings with regard to tightness and durability. It is a known fact that strip packings which are firmly connected both with the wall of the gate as well as with the wall of the lock itself can be used in connection with gates of which the theoretical pivoting axis is in or near the lock wall. When the gate is pivoted these band packings are bent through the pivoting angle of the gate, and they must therefore consist of resilient material. On the other hand a certain resistance to mechanical stresses is required in order that the packing may not be damaged or destroyed by solid bodies which may strike against it or by the water pressure to which it is subjected. This therefore necessitates a certain minimum thickness. As the thickness increases the pliability decreases and with it the danger of breakage after repeated bending. The requirements of great resistance and pliability are therefore conflicting.

The present invention reduces this disadvantage to within reasonable limits by securing a pile of independent packing strips in close touch to the lock and gate wall and in intimate contact with each other with no means between the packing strips to hold them in operative relation. According to the invention, the packing consists of several superimposed sheets of pliable or extensible material for example of rubber so that the thickness of the packing can be adjusted as required for the purpose of resisting mechanical stresses and water pressure, without the bending strain in the outermost layers of the material being dependent upon the total cross section of the packing sheets. The single layer is only subjected to the bending stress corresponding to its thickness. Resistance of the packing to sharp edged foreign bodies requires a certain hardness of the packing surface; this problem is solved according to the present invention by using as packing a metal sheet or both metal sheets and softer sheets of leather, rubber or the like, the metal sheets providing chiefly the mechanical resistance and the softer sheets the water tightness of the packing. The subdivision of the packing into separate thicknesses makes it possible for the packing to fit closer to uneven parts of the connection between the lock wall and the gate wall.

The drawing illustrates, by way of example, one form of application of the invention.

Figure 1:
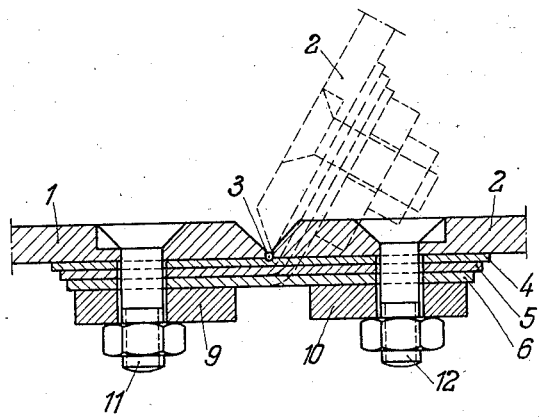
Figure 1 is a cross section through the lock wall and the gate wall and the packing for a design where the lock wall and the gate wall are substantially co-planar when the gate is closed. The open position of the gate is shown in dotted lines.
Figure 2:
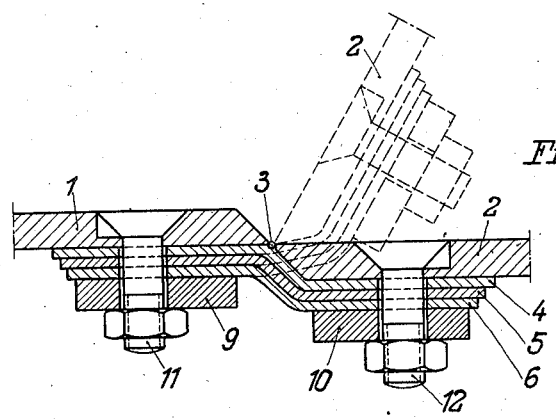
Figure 2 is a cross section similar to Figure 1 but in this design the lock wall and the gate wall both in the open, and in the closed position lie in different planes.
Figure 3:
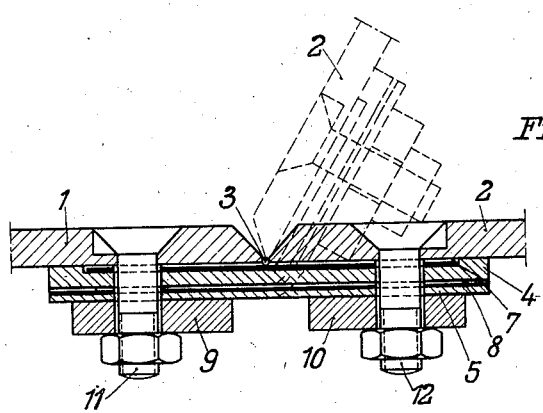
Figure 3 is a same cross section as Figure 1 but illustrates a combination of soft and metallic packing sheets.

In Figures 1, 2, and 3 the lock wall is marked 1; 2 is the gate wall; 3 is the theoretical pivoting axis round which the gate swings; 4, 5, 6, 7, and 8 are packing sheets composed of different layers secured in intimate unconnected contact with each other so as to form an extensible pile which is in intimate contact with the lock and gate wall; 9 and 10 are iron plates or the like by means of which the packings are pressed against the lock wall and the gate by means of the screws 11 and 12.

The pile of packing sheets may comprise only layers of packing strips of an extensible and flexible working material such as rubber or leather, but by inserting between them a further layer of sheet metal a greater resistance can be obtained. Said sheet metal strips are arranged between the elastic parts in such a manner that upon the movement of the united parts the sheet metal layer follows that movement by sliding over the extending elastic layers with which it is in contact.

As the illustration shows, at the place where the walls 1 and 2 of the lock and the gate are in contact and where it is impossible to avoid the formation of a crevice even of small dimensions, the resistance of the packing against water pressure is equal to the sum of the strengths of the superimposed packing sheets. All these separate sheets, when taken together, offer considerable resistance against water pressure and against foreign bodies which may occur through the narrow crevice. On the other hand, the pliability of the combined sheets is considerably greater than if only one packing having the same thickness as the sum total of the thicknesses of the sheets were used, since in bending relative displacement between the separate sheets is possible. The separate sheets which, as shown in Figure 2, are comparatively thin will fit much better to uneven contacts than a single piece, without undue stresses acting in the packing material.

In the case of the packing according to Figure 3 the resistance against impinging foreign bodies is particularly increased by the fact that the hard surface of the metal packing sheets 7 and 8 is particularly effective in preventing foreign bodies from entering the packing.

The number of packing sheets used is of no importance in connection with the object of the present invention, nor does it matter in what order metal and softer packing materials are superimposed. The essential point of the invention is that a packing of the resistance required by the water pressure and the attack by foreign bodies is obtained by the fact that a single uniform packing band is not employed but that several of these are superimposed.

What I claim and desire to secure by Letters Patent is:—

1. In a lock and gate structure the combination of a lock wall, a gate wall pivotally associated with the lock wall, and an extensible pile of independent packing strips bridging the adjacent longitudinal edges of the lock wall and gate wall and secured in intimate unconnected contact with each other and in intimate contact with the lock and gate wall.

2. In a lock and gate structure the combination of a lock wall, a gate wall pivotally associated with the lock wall, and an extensible pile of independent packing strips bridging the adjacent longitudinal edges of the lock wall and gate wall and consisting of sheet metal and a flexible material and secured in intimate unconnected contact with each other and in intimate contact with the lock and gate wall.

3. In a lock and gate structure the combination of a lock wall, a gate wall pivotally associated with the lock wall, and an extensible pile of independent packing strips at least a part of which consist of leather secured in intimate unconnected contact with each other and in intimate contact with the lock gate wall, said strips bridging the adjacent longitudinal edges of the lock wall and gate wall.

4. In a lock and gate structure the combination of a lock wall, a gate wall pivotally associated with the lock wall, and an extensible pile of independent packing strips bridging the adjacent longitudinal edges of the lock wall and gate wall and consisting of sheet metal and leather secured in intimate unconnected contact with each other and in intimate contact with the lock and gate wall.

5. In a lock and gate structure the combination of a lock wall, a gate wall pivotally associated with the lock wall, an extensible pile of independent packing strips bridging the adjacent longitudinal edges of the lock wall and gate wall and the said packing consisting alternately of extensible material and of sheet metal, iron plates on the said pile of packing strips, and means on the lock and gate wall for pressing the said iron plates against the packing strips and securing the same to the lock and gate wall so that they are held all over their breadth in close touch to the walls in any position of the same.

6. In a lock and gate structure the combination of a lock wall, a gate wall pivotally associated with the lock wall and an extensible pile composed of independent packing strips bridging the adjacent longitudinal edges of the lock wall and gate wall and secured in intimate unconnected contact with each other and in intimate contact with the lock and the gate wall substantially over their whole width.

7. In a lock and gate structure the combination of a lock wall, a gate wall pivotally associated with the lock wall and an extensible pile composed of independent packing strips bridging the adjacent longitudinal edges of the lock wall and gate wall and secured in intimate unconnected contact with each other and in intimate contact with the lock and gate wall substantially over their whole width, a part of said packing strips consisting of an extensible and flexible material, whereas at least one layer of sheet metal is inserted between said extensible and flexible layers so as to be able freely to slide over the surfaces of the extensible material with which it is in contact when said extensible material extends.

HANS ZIMMERMANN.